United States Patent [19]
Green, Jr. et al.

[11] Patent Number: 5,940,854
[45] Date of Patent: Aug. 17, 1999

[54] UNIQUE IDENTIFIER FOR OPTICAL MEDIA

[75] Inventors: Charles Otis Green, Jr., Benson; John Edward Kulakowski; Rodney Jerome Means, both of Tucson, all of Ariz.

[73] Assignee: International Business Machines Corporation, Armonk, N.Y.

[21] Appl. No.: 08/585,876

[22] Filed: Jan. 16, 1996

[51] Int. Cl.⁶ .................................................. G06F 12/00
[52] U.S. Cl. ............................................................ 711/112
[58] Field of Search .................................... 395/439, 438, 395/404; 360/48

[56] References Cited

U.S. PATENT DOCUMENTS

| | | | |
|---|---|---|---|
| 5,438,674 | 8/1995 | Keele et al. | 395/404 |
| 5,553,048 | 9/1996 | Maeda | 369/60 |
| 5,615,061 | 3/1997 | Singh | 360/60 |
| 5,617,393 | 4/1997 | Itami et al. | 369/58 |

*Primary Examiner*—Eddie P. Chan
*Assistant Examiner*—Reginald G. Bragdon
*Attorney, Agent, or Firm*—Robert M. Sullivan

[57] ABSTRACT

A unique and permanent identifier is provided for removable media. The identifier is preferably recorded in a previously unused or reserved portion of the media and can be generated from a combination of the originating drive serial number and the current date and time with a random number concatenated thereto. When a piece of media is loaded into a drive, the drive examines the reserved area for the presence of an identifier. If not present, the drive generates and records an identifier before performing whatever disk access operations have been requested. If the identifier is present, the drive is prevented from overwriting the identifier with a new one and the disk access operations are performed immediately. Once the media is provided with its identifier, the media, and any errors associated with the media, can be tracked throughout its life.

25 Claims, 3 Drawing Sheets

UNIQUE IDENTIFIER FOR OPTICAL MEDIA

TECHNICAL FIELD OF THE INVENTION

The present invention relates to optical media, and in particular, to providing a unique and un-alterable identifier for optical media, such as an optical disk.

BACKGROUND OF THE INVENTION

In a computer system employing removable media, it is desirable to keep records of media defects and errors. Entries in an error log table can be maintained for each piece of media so that the system can detect when a particular piece of media is failing and needs to be copied and replaced. However, tracking media is difficult unless the media is uniquely identifiable.

Like magnetic disk media, optical disk media (including 90 and 130 mm rewritable magneto-optical (MO) disks, 120 mm recordable and erasable compact disks (CD-R, CD-E), and proposed high-density and super-density compact disks (HDCD and SDCD)) are not manufactured with a serial number or other machine-readable identifier. When such a disk is first formatted or initialized, the host operating system or file system can assign a volume serial number and record it on the disk. However, as is known, the number can be later changed by the system, by application software or by the operator. And, in many systems, the number is automatically overwritten if the disk is reformatted or transferred to another operating system platform having different volume and file management requirements. Some UNIX systems may not even support recording the volume serial number on removable media.

It will be appreciated, therefore, that it becomes difficult to track media and log associated errors if media identifying numbers change. Information can be lost regarding the error history of each piece of media with a changed number, thereby increasing the difficulty with which media problems can be determined and preventive maintenance can be scheduled. Moreover, in some systems, removable optical media becomes, from the perspective of the operating system, a component of the optical disk drive in which it is mounted. Media failures thus are attributed to drive "hardware" problems and there is no ability to identify which of several (or many) removable optical disks was mounted in the drive when the failure occurred.

It will also be appreciated that it is difficult to track media by their manufacturing lots when identifying numbers change during the life of the media. It can be important to locate all media in a particular lot if it becomes known that some of the lot are defective.

SUMMARY OF THE INVENTION

In view of the foregoing, it is an object of the present invention to provide an identifier for removable media which remains with the media for its life.

This object and others are achieved in this invention by providing a unique and permanent identifier for each piece of media. The identifier is generated and recorded by the media manufacturer, the media distributor or the end-user and is preferably recorded in a previously unused or reserved portion of the media. The identifier itself can be generated from a combination of the originating drive serial number and the current date and time with a random number concatenated thereto. Additionally, if the media manufacturer records the identifier, the identifier can also include the media lot number.

When a piece of media is loaded into a drive, the drive examines the reserved area for the presence of an identifier. If not present, the drive generates and records an identifier before performing whatever disk access operations have been requested. However, if the identifier is present, the drive is prevented from overwriting the identifier with a new one and the disk access operations are performed immediately. Once the media is provided with its identifier, the media, and any errors associated with the media, can be tracked throughout its life.

The foregoing and other features and advantages of the invention will be apparent from the following more particular description of preferred embodiments of the invention, as illustrated in the accompanying drawings.

DETAILED DESCRIPTION OF THE INVENTION

Figure 1:
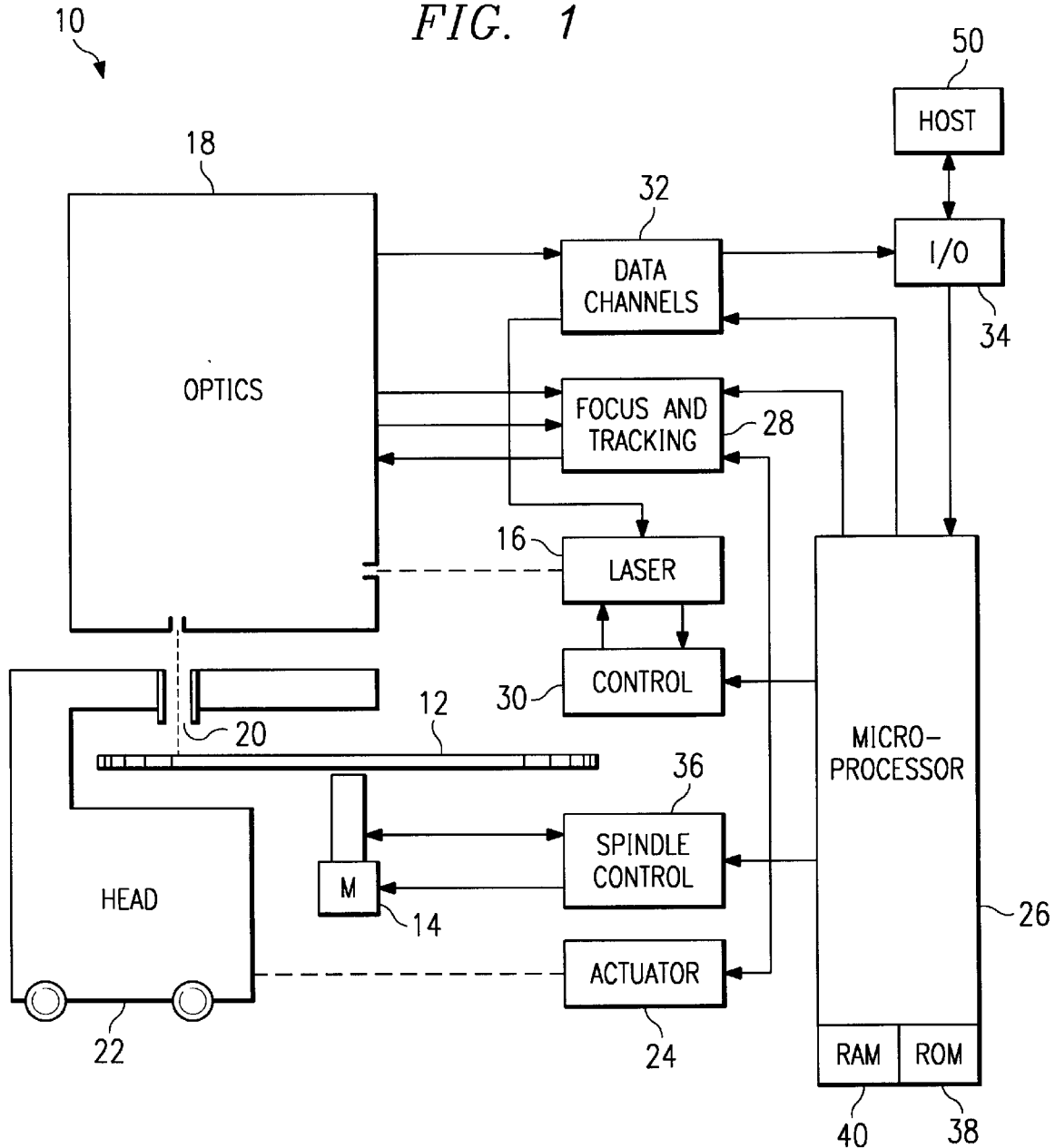
FIG. 1 is a block diagram of an optical disk drive with which the present invention can be employed.

FIG. 1 is a block diagram of an optical disk drive 10 with which the present invention can be employed. While the drive 10 may be particularly adapted as a magneto-optical (MO) drive, the general structure can also be employed in a CD-format drive (such as for CD-R, CD-E, HDCD and SDCD formatted optical systems) and the following description will apply generally to both MO and CD-format drives. In FIG. 1, an optical disk 12 is shown mounted for rotation by a motor 14. Light from a laser 16 is directed through stationary optical elements 18 and through an objective lens 20 to be focused onto any of a large plurality of addressable tracks on a surface of the disk 12. The objective lens 20 is moved in a radial direction relative to the disk 12 by a coarse carriage 22. The radial motion of the carriage 22 is directed by an actuator 24 which is under the control of a microprocessor controller 26 while focus and fine tracking control are directed by a focus and tracking circuit 28, also directed by the microprocessor controller 26.

Modulation and other power control of the laser 16 is directed by a laser driver 30 under the control of the microprocessor controller 26. Data read from or to be written to the disk 12 is processed through data channels 32 while an interface 34 interconnects the drive 10 with an external host device 50. Speed control of the motor 14 is performed by a control circuit 36 connected to the microprocessor controller 26. Associated with the microprocessor controller 26 is a program-storing, read-only memory (ROM) 38 and a data and control-signal storing random access memory (RAM) 40.

Figure 2A:
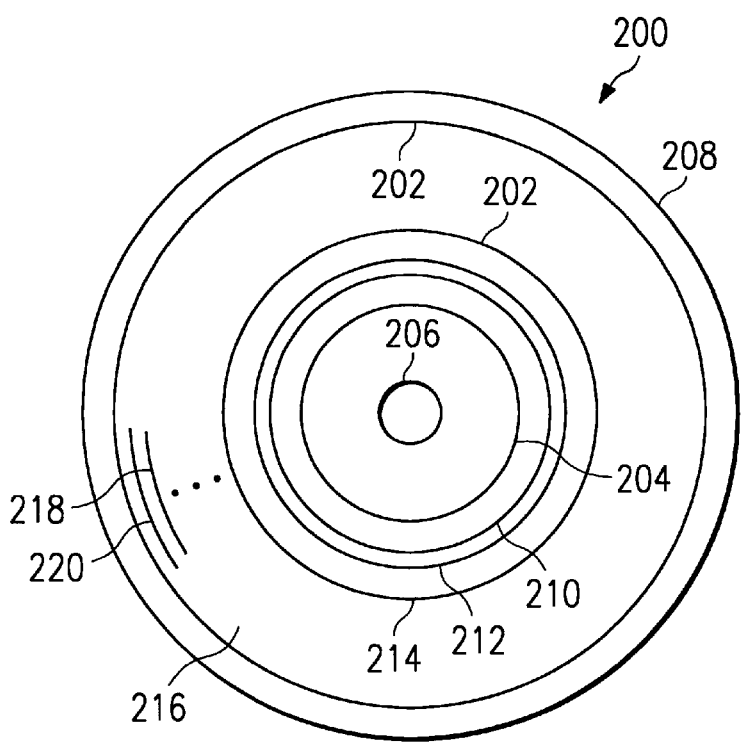
FIG. 2A is a plan view of a magneto-optical disk.

FIG. 2A is a simplified plan view of a magneto-optical disk 200 with multiple tracks 202 (which, although shown as being concentric for clarity in the FIGURE, actually form a continuous spiral). Beginning at the inner diameter 204 nearest the spindle hole 206 and extending outward toward the outer diameter 208, the disk 200 includes: an inner manufacturer's zone (with a phase-encoded part (PEP) 210, a first standard format part (SFP) 212, a first manufacturer area (MFG) 214), a user zone 216, and an outer manufacture's zone (with a second MFG 218 and a second SFP 220). Not shown are lead-in and lead-out areas. In 2x-capacity MO media (1.2 GB and 1.3 GB disks), the tracks are numbered from the innermost track 0 to the outermost track N while in 3x- and 4x-capacity MO media (2.4 GB and 2.6 GB disks), the tracks in the user zone are numbered from the outermost track 0 to the innermost track N. The number of tracks N on a disk depends upon the specific size and format of the disk 200. Additionally, each track is divided into a number M addressable sectors. It will be recognized that the numbering of the physical tracks (corresponding to revolutions of the disk 200) does not coincide with the numbering of logical tracks.

Figure 2B:
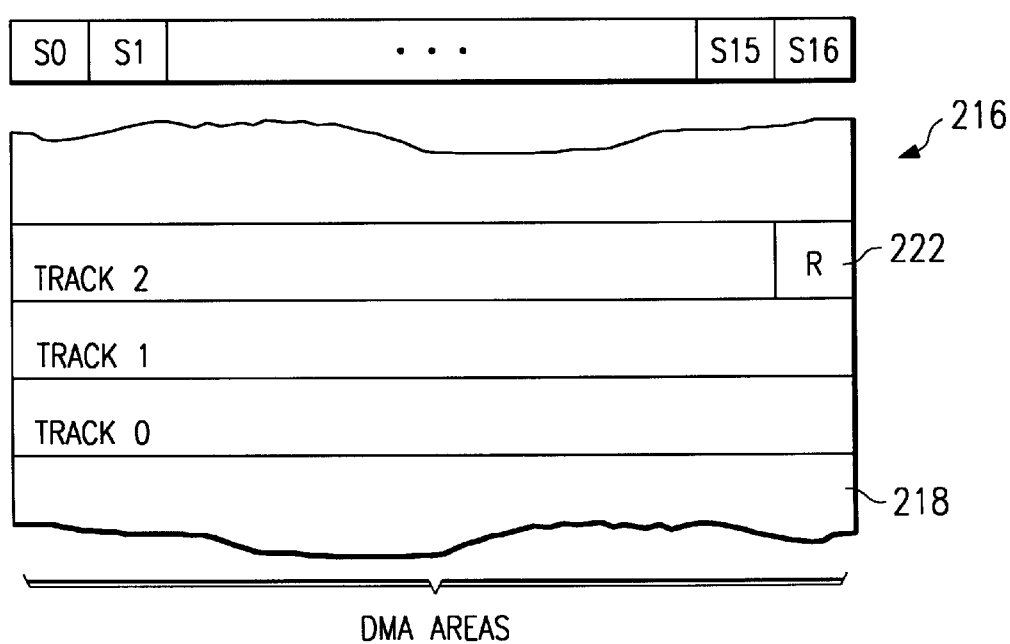
FIG. 2B is a schematic illustration of a portion of the MO disk of FIG. 2A.

The inner and outer portions of the user zone each include a defect management area (DMA) containing defect management tables used to identify defective sectors taken out of service and to identify the sectors allocated as replacements. Within each DMA are sectors, such as sector number 16 in tracks 2 and N, which are not designated for use under the current standards. FIG. 2B illustrates the inner portion of the user zone 216 in a linear fashion, including reserved sector 222 in track 2.

Figure 3:
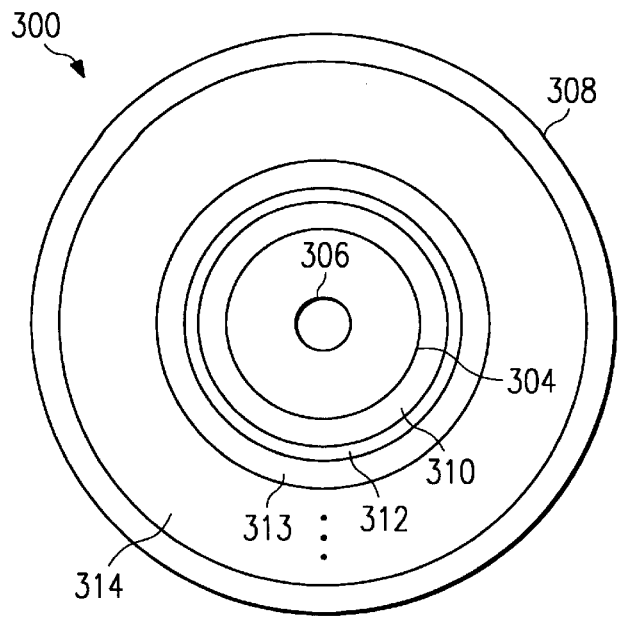
FIG. 3 is a schematic illustration of a CD-format optical disk.

FIG. 3 is a simplified plan view of a CD-format optical disk 300, such as recordable (CD-R), erasable (CD-E) or high-density (HD-CD). Beginning at the inner diameter 304 nearest the spindle hole 306 and extending outward toward the outer diameter 308, the disk 300 includes: a power calibration area (PCA) 310, a program memory area (PMA) 312 having optional portions, a lead-in area 313 and a program area 314. The lead-in area 313 includes a table of contents (TOC). Currently, space for a six-digit number is available in each of fifty frames in the PMA 312.

Figure 4:
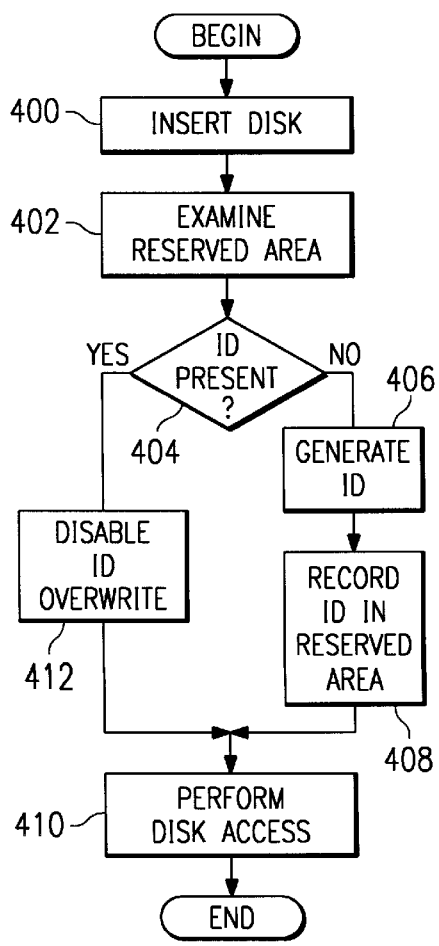
FIG. 4 is a flow chart of a method of the present invention.

The present invention provides an identifier, unique to each optical disk, which is generated and recorded on a specific area of the disk. Preferably, the identifier is recorded on the disk when the disk is first initialized or formatted (either by the manufacturer or the end user). FIG. 4 is a flowchart of an exemplary method of the present invention.

After the disk 12 has been inserted into the drive 10 (Step 400), the reserved area on the disk is read (Step 402) to determine whether an identifier is already present (Step 404). If the identifier is absent, the drive 10 generates a unique identifier (Step 406). For example, the identifier can be created from a combination of the drive serial number, the current date and time (including the second) and a random number. The media lot number can also be included if the unique identifier is generated and recorded by the media manufacturer. The drive serial number is obtained from permanent storage in read-only memory in the drive 10; the date and time are obtained from a clock on-board the drive 10 or host 50; and the random number can be obtained from an on-board random number generator.

After the identifier is created (Step 406), it is recorded in the reserved area of the disk (Step 408) and the drive 10 can perform standard disk access operations (Step 410).

If, on the other hand, an identifier is detected (Step 404), the drive 10 is prevented from writing a new identifier (Step 412). When the media is write-once media (such as WORM or CD/R), the identifier is permanent and cannot be overwritten. When the media is rewritable (such as MO or CD/E), the presence of an identifier in the reserved area causes the drive controller 26 to disable or bypass that portion of the process which generates and records a new identifier, thereby preventing the original identifier from being overwritten and lost.

As described above, the last sector of track 2 and of track N of an ISO standard MO (such as ISO/IEC 13549) and WORM disks are currently unused and set aside for unspecified future use. The present invention contemplates locating the unique identifier for MO and WORM media in either or both of these sectors. As also described above, there are unused portions of the PCA and PMA areas of ISO-standard CD-format disks (such as ISO/IEC 10149), such as the above-noted space in each of fifty frames in the PMA 312. The present invention contemplates locating the unique identifier for CD-format media in such an unused portion.

Figure 5:
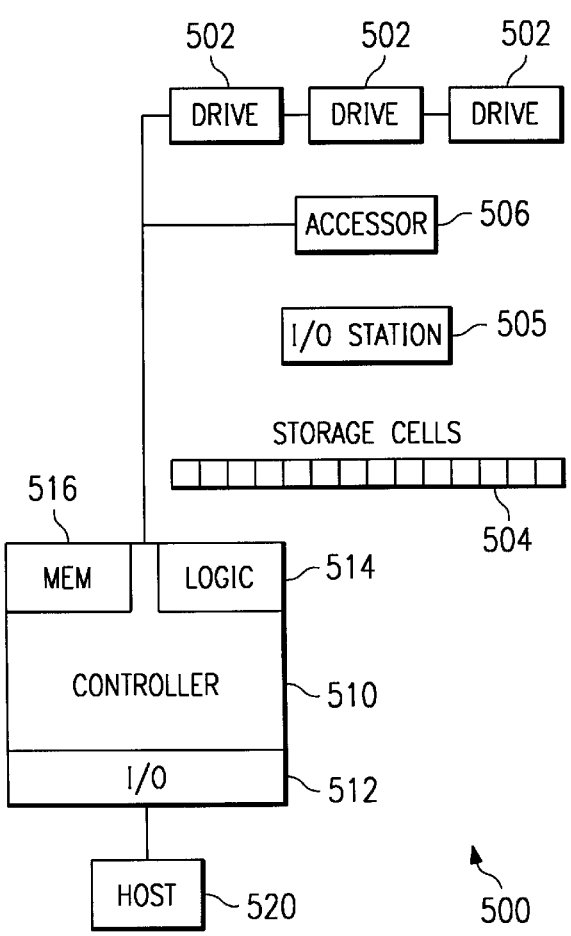
FIG. 5 is a block diagram of an automated data storage and retrieval library in which the present invention can be employed.

FIG. 5 is a block diagram of an automated data storage and retrieval library 500 in which the present invention can be advantageously employed. The library 500 includes one or more optical drive units 502, storage cells 504 to retain optical disks in cartridges or multi-disk magazines, an input/out (I/O) station 505 for inserting and removing media, an accessor 506 for retrieving disks and transporting them between the drives, the I/O station 505 and the cells, and a library controller 510 which directs the operations of the accessor 506 and drives 502. The controller 510 can be a dedicated computer, such as a personal computer; alternatively, the library can be under the control of the host device 520. When the controller 510 is a dedicated unit, it includes, among other elements, an interface 512, logic 514 and memory 516. The general operation of storage libraries is well known and will not be described herein.

The library controller 510 can maintain a table in its memory 516 in which defect errors are logged for each disk in the library 500, based upon each unique identifier. When a disk is exported from the library 500 to another platform, the error log can also be exported, without risking the loss of the error data, which risk was present in the past if the identifier changed. Consequently, when the number of errors detected in a particular disk, or when the rate of error accumulation, exceeds a predetermined amount, the data can be copied onto a replacement disk and the original discarded.

Another benefit can be realized by tracking software which is distributed on optical media with the unique media identifier of the present invention. Copies of the software are detectable by host software because the media identifier of the copy will be different from the identifier of the original. When a copy is made to a piece of optical media, it will have the time stamp and serial number in the unique identifier reflecting the date the copy was made. Software compares inventoried identifiers with copied software to locate discrepancies.

While the invention has been particularly shown and described with reference to preferred embodiments thereof, it will be understood by those skilled in the art that various changes in form and details may be made therein without departing from the spirit and scope of the invention.

What is claimed is:

1. A method for establishing a unique identifier for an optical recording disk, comprising the steps of:

mounting an optical disk in a drive unit;

reading information from a reserved area of the optical disk;

determining whether a disk identifier is present in the reserved area;

if no disk identifier is present in the reserved area:

generating a unique disk identifier by concatenating a random number with a serial number of the drive unit, a current date, and a current time; and recording the generated disk identifier in the reserved area; and if a disk identifier is present in the reserved area, preventing a new disk identifier from being recorded in the reserved area.

2. The method of claim 1, wherein said step of reading the reserved area comprises the step of reading a predetermined portion of a defect management area.

3. The method of claim 2, wherein said step of reading a predetermined portion of the defect management area comprises the step of reading sector 16 in track 2 in a first defect management area located proximate an inner circumference of the optical disk.

4. The method of claim 2, wherein said step of reading a predetermined portion of the defect management area comprises the step of reading sector 16 in track N in a second defect management area located proximate an outer circumference of the optical disk, where N represents the last track on the optical disk.

5. The method of claim 1, wherein said step of reading the reserved area comprises the step of reading a portion of a table of contents.

6. The method of claim 1 further comprising, the steps of, if a disk identifier is present:

comparing the disk identifier with a list of inventoried identifiers; and indicating if the disk identifier is not on the list.

7. A data recording system, comprising:

a loader mechanism;

an optical head;

read/write channels;

an interface for interconnecting the data recording system with a host device; and a controller having a memory, said controller determining whether a disk identifier is present in a reserved area of an optical disk mounted in the data recording system, wherein, if no disk identifier is present in the reserved area, said controller generates a unique disk identifier by concatenating a random number with a serial number, a current date, and a current time, and records the generated disk identifier in the reserved area, and wherein, if a disk identifier is present in the reserved area, said controller prevents a new disk identifier from being recorded in the reserved area.

8. The data recording system of claim 7, wherein said controller further determines whether a disk identifier is present in a defect management area of the optical disk.

9. The data recording system of claim 7, wherein said controller further determines whether a disk identifier is present in sector 16 of track 2 of the optical disk.

10. The data recording system of claim 7, wherein said controller further determines whether a disk identifier is present in sector 16 of track N of the optical disk, where N represents the last track on the optical disk.

11. The data recording system of claim 7, wherein said controller further determines whether a disk identifier is present in a table of contents on the optical disk.

12. An optical disk, comprising:

a user-data portion having a first plurality of data-storing entities;

a manufacturer's-data portion having a second plurality of data-storing entities;

a reserved area within said manufacturer's-data portion; and an identifier, unique to the optical disk, recorded in said reserved area, said identifier further including a random number concatenated with a current date, a current time, and an identifying number of an optical drive unit which recorded said identifier.

13. The optical disk of claim 12, wherein:

said manufacturer's-data portion includes a defect management area; and said reserved area is located within said defect management area.

14. The optical disk of claim 12, wherein:

said manufacturer's-data portion includes a first defect management area at an inner circumference of the optical disk and a second defect management area at an outer circumference of the optical disk; and said reserved area is located within said first defect management area, within said second defect management area or within both said first and second defect management areas.

15. The optical disk of claim 12, wherein:

said manufacturer's-data portion includes a power control and program memory (PCA/PMA) area; and said reserved area is located within said PCA/PMA area.

16. The optical disk of claim 15, wherein said reserved area is located in a table of contents portion of said PCA/PMA area.

17. A data storing apparatus, comprising:

a housing;

an optical disk retained within said housing;

a user-data portion on a recording surface of said optical disk;

a defect management area on the recording surface; and an identifier, unique to said optical disk, recorded in an area of said defect management area reserved for said identifier, said identifier further including a random number concatenated with a current date, a current time, and an identifying number of an optical drive unit which recorded said identifier.

18. The data storing apparatus of claim 17, wherein:

said optical disk includes a plurality of tracks;

each said track includes a plurality of sectors; and said reserved area is located in sector 16 of track 2, where N represents the last track on the optical disk.

19. The data storing apparatus of claim 17, wherein:

said optical disk includes a plurality of tracks;

each said track includes a plurality of sectors; and said reserved area is located in sector 16 of track N, where N represents the last track on the optical disk.

20. The data storing apparatus of claim 17, wherein:

said optical disk includes a plurality of tracks;

each said track includes a plurality of sectors; and a first portion of said reserved area is located in sector 16 of track 2 and a second portion of said reserved area is located in sector 16 of track N, where N represents the last track on the optical disk.

21. An automated data storage and retrieval library system, comprising:

a plurality of cartridge storage cells;

a optical drive unit;

an accessor for transporting optical cartridges between said storage cells and said drive unit;

an interface interconnecting said drive unit with a host device; and a library controller having a memory, said library controller determining whether a disk identifier is present in a reserved area of an optical disk mounted in the drive unit, wherein, if no disk identifier is present in the reserved area, said library controller generates a unique disk identifier by concatenating a random number with a serial number of said drive unit, a current date, and a current time, and records the generated disk identifier in the reserved area, and wherein, if a disk identifier is present in the reserved area, said library controller prevents a new disk identifier from being recorded in the reserved area.

22. The automated data storage and retrieval library system of claim 21, wherein said library controller further determines whether a disk identifier is present in a defect management area of the optical disk.

23. The automated data storage and retrieval library system of claim 21, wherein said library controller further determines whether a disk identifier is present in sector 16 of track 2 of the optical disk.

24. The automated data storage and retrieval library system of claim 21, wherein said library controller further determines whether a disk identifier is present in sector 16 of track N of the optical disk, where N represents the last track on the optical disk.

25. The automated data storage and retrieval library system of claim 21, wherein said library controller further determines whether a disk identifier is present in a table of contents on the optical disk.

* * * * *